US012779905B2

(12) United States Patent
Yan et al.

(10) Patent No.: US 12,779,905 B2
(45) Date of Patent: Nov. 3, 2026

(54) LIFTING AND PLACING CASTER

(71) Applicant: BENYU CASTERS & WHEELS CO., LTD, Foshan (CN)

(72) Inventors: Shicong Yan, Foshan (CN); Youwei Liu, Foshan (CN); Wen Chen, Foshan (CN)

(73) Assignee: BENYU CASTERS & WHEELS CO., LTD, Foshan (CN)

( * ) Notice: Subject to any disclaimer, the term of this patent is extended or adjusted under 35 U.S.C. 154(b) by 0 days.

(21) Appl. No.: 19/208,022

(22) Filed: May 14, 2025

(65) Prior Publication Data

US 2026/0124858 A1 May 7, 2026

(30) Foreign Application Priority Data

Nov. 6, 2024 (CN) ......................... 202422709897.7

(51) Int. Cl.
*B60B 33/06* (2006.01)
*B60B 33/00* (2006.01)

(52) U.S. Cl.
CPC ........ *B60B 33/066* (2013.01); *B60B 33/0018* (2013.01); *B60B 33/0039* (2013.01)

(58) Field of Classification Search
CPC ....... B60B 33/04; B60B 33/06; B60B 33/063; B60B 33/066; B60B 33/0018; B60B 33/0039; B60B 2200/20; B60B 2900/112; B60B 2900/3312; B43L 1/00; B43L 1/02; B43L 1/04
See application file for complete search history.

(56) References Cited

U.S. PATENT DOCUMENTS 2,718,657 A * 9/1955 Sebastian ............... A63G 19/20
16/34
4,588,203 A * 5/1986 Anderson ............... B63C 13/00
114/344
4,773,123 A * 9/1988 Yu .......................... A45C 5/146
280/37
4,845,804 A * 7/1989 Garrett .................... B60B 33/06
16/33

(Continued)

FOREIGN PATENT DOCUMENTS

JP 2016094058 A * 5/2016
KR 20170133993 A * 12/2017 ........... B60B 33/045
SU 688585 A1 * 9/1979

*Primary Examiner* — Chuck Y Mah
(74) *Attorney, Agent, or Firm* — Whiteford, Taylor & Preston, LLP; Peter J. Davis

(57) ABSTRACT

A lifting and placing caster includes a mounting seat, a mounting frame, a swing rod and a limiting rod. One end of the mounting frame is rotatably connected to the mounting seat. The mounting frame has a roller and a first rotating shaft. The mounting frame has a strip through hole throughout which the first rotating shaft is disposed. The first rotating shaft can reciprocate in an extension direction of the strip through hole. One end of the swing rod is rotatably connected to the mounting seat, and the other end of the swing rod is rotatably connected to the first rotating shaft. The limiting rod is rotatably connected to the mounting frame. The roller can be driven to switch between a first position and a second position through the rotation of the mounting frame.

10 Claims, 3 Drawing Sheets

(56) References Cited

U.S. PATENT DOCUMENTS

| | | | | | |
|---|---|---|---|---|---|
| 5,253,389 | A * | 10/1993 | Colin | B60B 33/066 16/34 |
| 5,365,635 | A * | 11/1994 | Jang | B60B 33/0039 16/34 |
| 5,375,294 | A * | 12/1994 | Garrett | B60B 33/066 16/34 |
| 5,575,036 | A * | 11/1996 | May | B60B 33/0018 16/34 |
| 5,940,932 | A * | 8/1999 | LaHay | B60B 33/06 16/30 |
| 5,956,805 | A * | 9/1999 | Huang | B60B 33/0063 16/33 |
| 6,478,315 | B1 * | 11/2002 | Manesis | A45C 5/14 280/47.131 |
| 6,920,656 | B2 * | 7/2005 | Roussy | A61G 7/0528 16/19 |
| 9,333,823 | B2 * | 5/2016 | Shahroodi | B60D 1/665 |
| 9,586,442 | B2 * | 3/2017 | Trickle | B60B 33/0005 |
| 2002/0166202 | A1 * | 11/2002 | Maupin | B60B 33/0039 16/19 |
| 2003/0102642 | A1 * | 6/2003 | Wang | A43B 5/1633 280/11.233 |
| 2005/0217071 | A1 * | 10/2005 | Shinner | B60B 33/0028 16/19 |
| 2010/0038517 | A1 * | 2/2010 | Home | B60B 33/06 126/304 R |
| 2014/0060990 | A1 * | 3/2014 | Arthur | A45C 5/146 16/34 |
| 2025/0381799 | A1 * | 12/2025 | Sascha | A61G 7/08 |

* cited by examiner

LIFTING AND PLACING CASTER

CROSS-REFERENCE TO RELATED APPLICATIONS

This application is based on and claims the priority of Chinese patent application No. 202422709897.7 filed on Nov. 6, 2024, the disclosure of which is incorporated herein by reference in its entirety.

TECHNICAL FIELD

The present disclosure relates to the technical field of roller apparatuses, and in particular, to a lifting and placing caster.

BACKGROUND

Rollers are usually mounted on various device to facilitate the movement and transportation of the device. Some roller apparatuses have a folding structure, so that when a movement is not required, the roller apparatus can be folded up, thereby facilitating the direct placement of the device on the ground. However, the related roller apparatus is too complex in structure to operate inconveniently.

SUMMARY

The present disclosure discloses a lifting and placing caster.

An embodiment of the present disclosure provides a lifting and placing caster, which includes:

- a mounting seat;
- a mounting frame, where one end of the mounting frame is rotatably connected to the mounting seat, the mounting frame has a roller and a first rotating shaft, the roller is positioned on a lower side of the mounting frame, the mounting frame has a strip through hole throughout which the first rotating shaft is disposed, the first rotating shaft can reciprocate in an extension direction of the strip through hole, two ends of the strip through hole are a first end and a second end, respectively, and the first end is positioned between the second end and a connecting point of the mounting frame and the mounting seat;
- a swing rod, where one end of the swing rod is rotatably connected to the mounting seat, and the other end of the swing rod is rotatably connected to the first rotating shaft; and
- a limiting rod rotatably connected to the mounting frame.

The roller can be driven to switch between a first position and a second position through the rotation of the mounting frame.

When the roller is in the first position, the roller is below the mounting seat and subjected to an upward force exerted by a support surface, the first rotating shaft has a tendency to move towards the second end such that the first rotating shaft abuts against one end of the limiting rod, the other end of the limiting rod abuts against the mounting frame, and the mounting frame achieves self-locking.

When the limiting rod is separated from the first rotating shaft, the first rotating shaft can move toward the direction of the second end, the roller is driven to move upward to the second position through the rotation of the mounting frame, and when the roller is in the second position, the roller is higher than a lowermost end of the mounting seat.

According to an embodiment of the present disclosure, the lifting and placing caster has at least the following technical effects. The mounting seat of the lifting and placing caster is mounted at a lower end of a side wall of a device. When the roller is required, the mounting frame is rotated such that the roller moves to the first position. At this time, the roller is below the mounting frame, and the roller is in contact with the ground to support the device. The roller is subjected to an upward force exerted by the ground, such that the mounting frame has a tendency to swing upward at one end away from the mounting seat, and the swing rod also has the tendency to swing upward at one end away from the mounting seat. That is, the first rotating shaft has the tendency to move towards the second end. Since the two ends of the limiting rod abut against the first rotating shaft and the mounting frame, respectively, the first rotating shaft cannot move toward the second end due to being blocked by the limiting rod, such that the mounting frame achieves self-locking. When the roller is not required, the limiting rod is separated from the first rotating shaft, and the first rotating shaft moves towards the second end, such that the swing rod and the mounting frame swing upward, and the roller swings upward to the second position. The roller is above the lowermost end of the mounting seat, and the roller does not support the device any more. The lifting and placing caster is simple in structure, easy to operate, and convenient for users to use.

According to some embodiments of the present disclosure, the mounting frame is positioned on a left side of the mounting seat, a second rotating shaft is fixedly disposed on the mounting frame, and a middle of the limiting rod is rotatably connected to the second rotating shaft.

According to some embodiments of the present disclosure, when the roller is in the first position, the second rotating shaft is positioned above the strip through hole, a right end of the limiting rod is positioned below the first rotating shaft, the first rotating shaft exerts a leftward force to the limiting rod such that the limiting rod has a tendency to rotate clockwise, the mounting frame abuts against a left end of the limiting rod to limit the rotation of the limiting rod, and the mounting frame achieves self-locking.

According to some embodiments of the present disclosure, when the mounting frame is in a self-locking state and the limiting rod rotates counterclockwise, the limiting rod pushes the first rotating shaft to move toward a direction of the first end, such that a right end of the limiting rod moves to above the first rotating shaft, the first rotating shaft moves toward the direction of the second end, and the mounting frame swings upward such that the roller moves to the second position.

According to some embodiments of the present disclosure, a via hole is formed in an upper end of the mounting frame, and the left end of the limiting rod can rotate upward or downward through the via hole.

According to some embodiments of the present disclosure, the lifting and placing caster further includes a reset spring. One end of the reset spring is connected to the mounting frame and the other end of the reset spring is connected to the first rotating shaft. The reset spring is always in a stretching state, and the reset spring exerts a force to the first rotating shaft to move toward the direction of the second end.

According to some embodiments of the present disclosure, when the roller is in the first position, a connecting end of the swing rod and the mounting seat is above the first rotating shaft. When the limiting rod is separated from the first rotating shaft, the first rotating shaft moves towards the second end under the cooperation of the reset spring and the roller, and the swing rod and the mounting frame rotate in a clockwise direction.

According to some embodiments of the present disclosure, the lifting and placing caster further includes a torsional spring mounted on the limiting rod. The torsional spring exerts a twisting force to the limiting rod such that the limiting rod has a tendency to rotate in a clockwise direction.

According to some embodiments of the present disclosure, when the roller is in the second position, a lower end of the limiting rod fits with the first rotating shaft. When the first rotating shaft moves toward the direction of the first end such that the right end of the limiting rod is positioned on a left side of the first rotating shaft, the limiting rod rotates in a clockwise direction under the action of the torsional spring such that the right end of the limiting rod is below the first rotating shaft. The left end of the limiting rod abuts against the mounting frame, the roller moves to the first position, and the mounting frame achieves self-locking.

According to some embodiments of the present disclosure, when the roller is in the first position, the strip through hole extends in a left-right direction, a right end of the strip through hole is the first end, and a left end of the strip through hole is the second end.

Additional aspects and advantages of the present disclosure will be given in part in the following description, and in part will become apparent from the following description, or will be learned through the practice of the present disclosure.

BRIEF DESCRIPTION OF DRAWINGS

The above and/or additional aspects and advantages of the present disclosure will become apparent and easily understood from the description of the embodiments in conjunction with the following accompanying drawings, in which.

Figure 1:
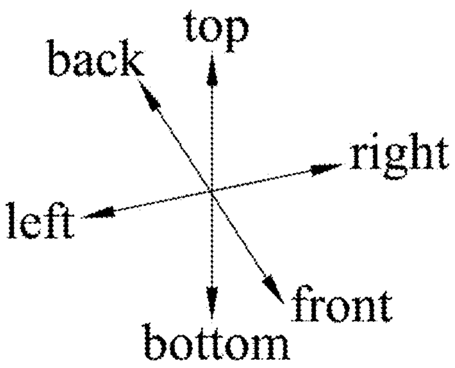
FIG. 1 is a schematic structural diagram of a lifting and placing caster in some embodiments of the present disclosure.
Figure 1:
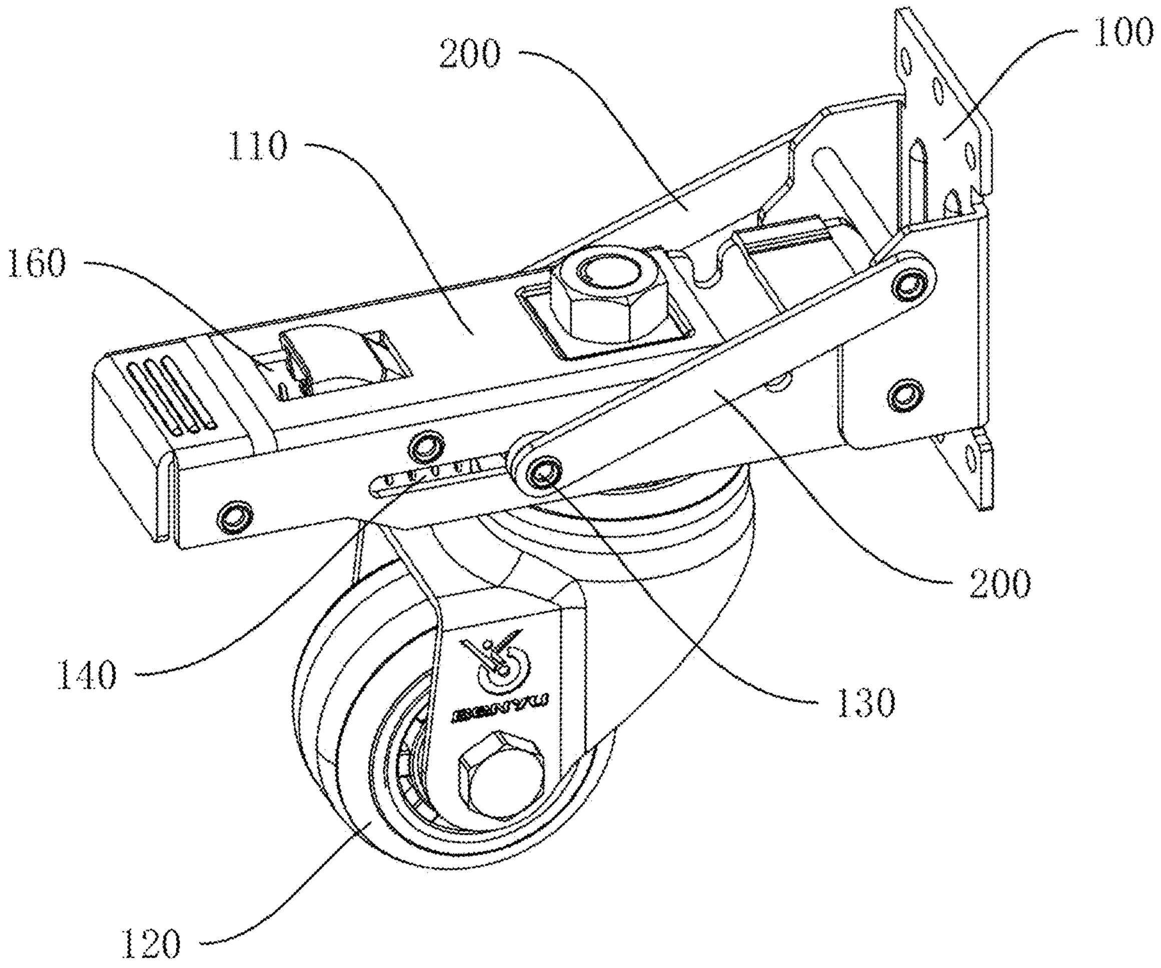

REFERENCE NUMERALS mounting seat 100, mounting frame 110, roller 120, first rotating shaft 130, strip through hole 140, second rotating shaft 150, via hole 160;

swing rod 200, limiting rod 210, reset spring 220, torsional spring 230.

DETAILED DESCRIPTION

The embodiment of the present disclosure is described in detail below, the example of the embodiment is shown in the accompanying drawings, and from beginning to end, the same or similar reference numerals indicate the same or similar elements or elements with same or similar functionality. The embodiment described with reference to the accompanying drawings is an example, which is merely used to explain the present disclosure, instead of being understood as a limitation to the present disclosure.

In the description of the present disclosure, it is understood that orientation or position relationships indicated by the terms "upper", "lower", "front", "rear", "left", and "right", and the like are based on the orientation or position relationships as shown in the accompanying drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the described "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless specific limitation otherwise, terms "dispose", "mount", "connect" and the like should be generally understood. Those of ordinary skill in the art may reasonably determine the specific meaning of the terms in the present disclosure in combination with the specific contents of the technical solution.

The present disclosure is further described in combination with the accompanying drawings below.

Figure 2:
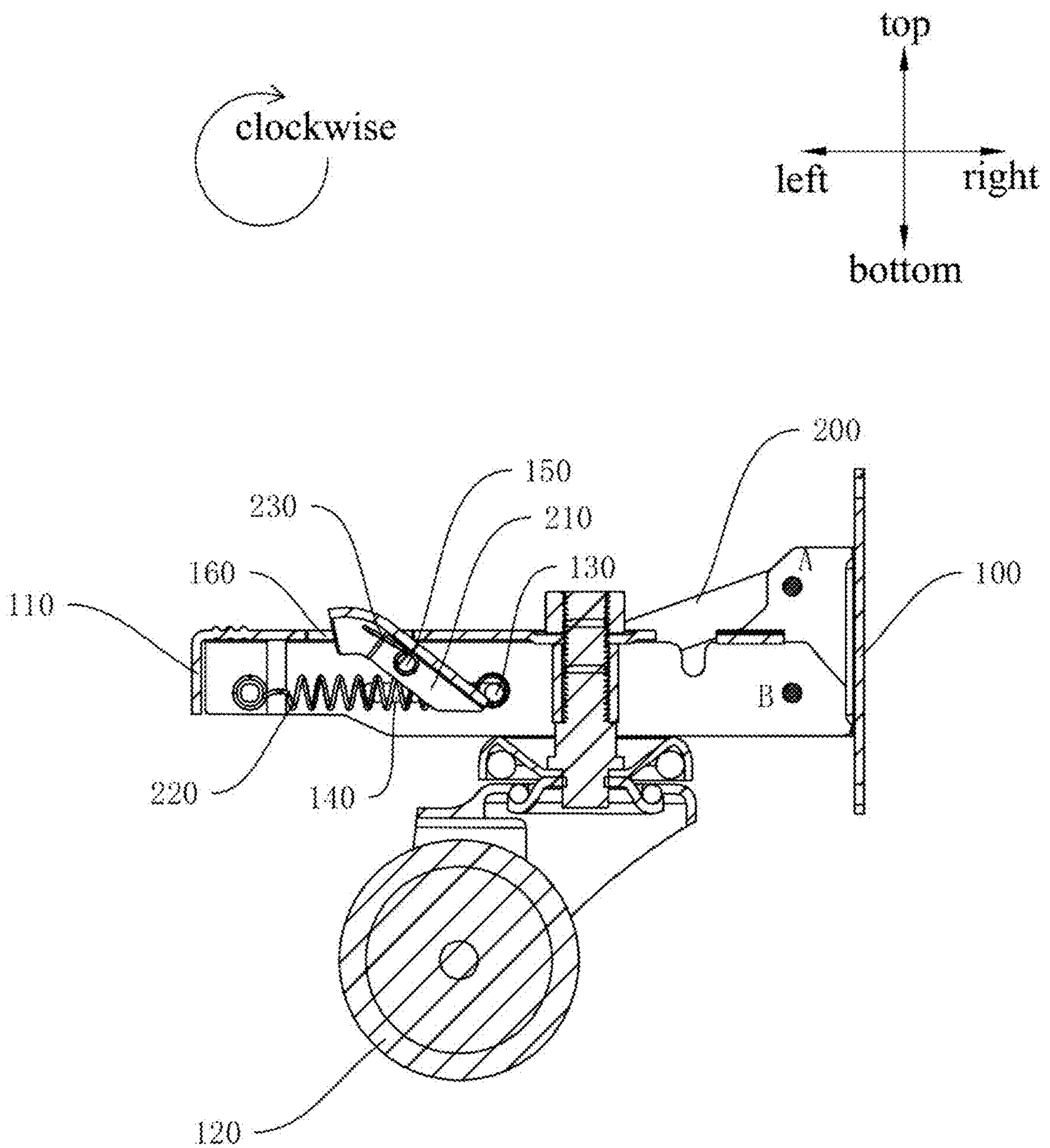
FIG. 2 is a schematic structural diagram of a roller positioned in a first position in some embodiments of the present disclosure.
Figure 3:
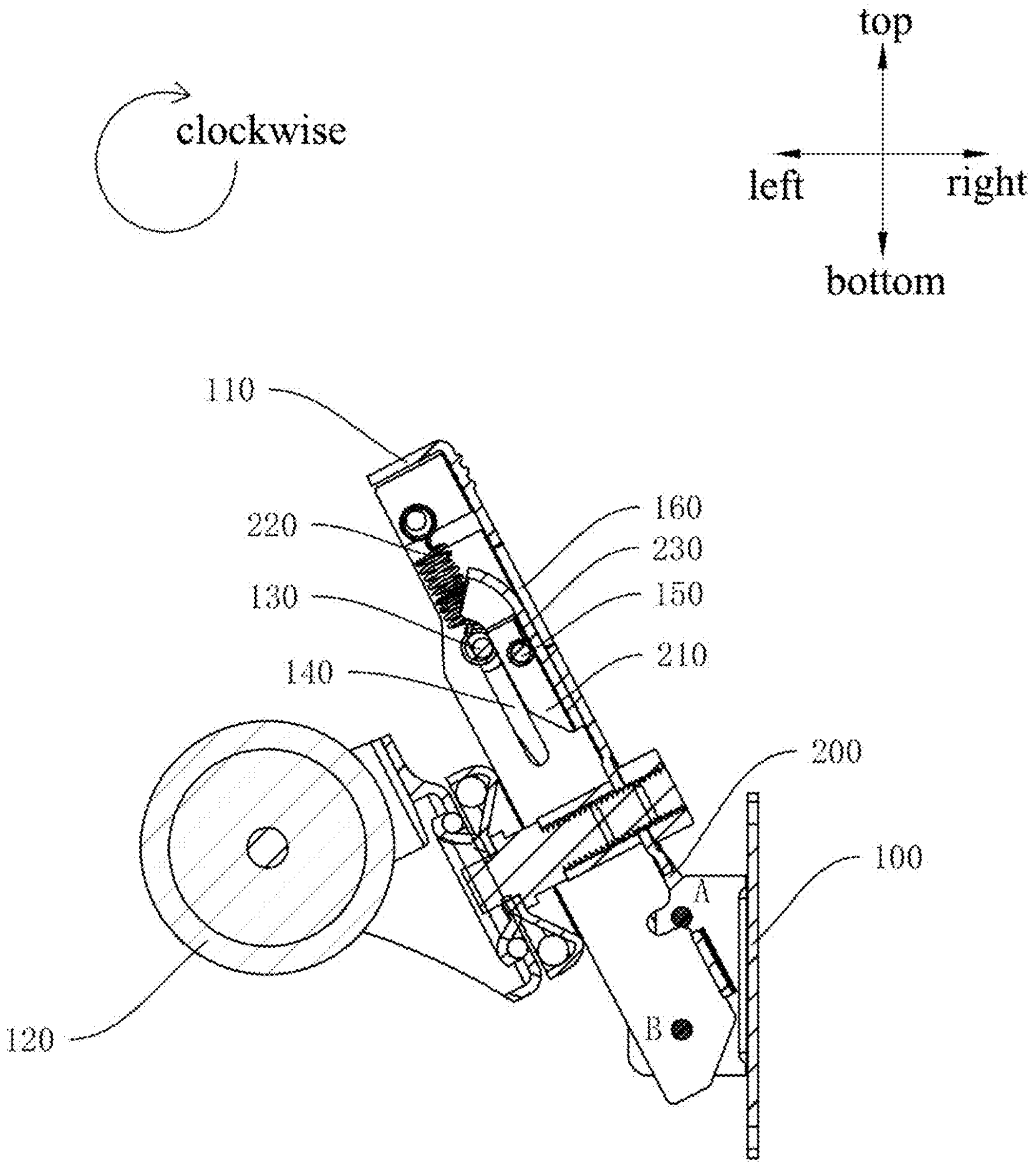
FIG. 3 is a schematic structural diagram of a roller positioned in a second position in some embodiments of the present disclosure.

According to some embodiments of the present disclosure, referring to FIG. 1 to FIG. 3, a lifting and placing caster includes a mounting seat 100, a mounting frame 110, a swing rod 200 and a limiting rod 210. The mounting frame 110 is positioned on a left side of the mounting seat 100, and a right end of the mounting frame 110 is rotatably connected to the mounting seat 100. A roller 120 is disposed at a bottom of the mounting frame 110. A first rotating shaft 130 is disposed on the mounting frame 110. A strip through hole 140 is formed in a side wall of the mounting frame 110. The first rotating shaft 130 is disposed throughout the strip through hole 140 in such way that the first rotating shaft 130 can reciprocate along an extension direction of the strip through hole 140. Two ends of the strip through hole 140 are a first end and a second end, respectively. The first end is positioned between the second end and a connecting point of the mounting frame 110 and the mounting seat 100. The connecting point of the mounting frame 110 and the mounting seat 100 is point B, that is, the first end is positioned between the second end and the point B. Referring to FIG. 1 and FIG. 2, when the roller 120 is in the first position, the strip through hole 140 extends in a left-right direction. The first end is a right end of the strip through hole 140, and the second end is a left end of the strip through hole 140. A right end of the swing rod 200 is rotatably connected to the mounting seat 100. A connecting end between the swing rod 200 and the mounting seat 100 is point A, and a left end of the swing rod 200 is rotatably connected to the first rotating shaft 130. The limiting rod 210 is positioned in the mounting frame 110 and rotatably connected to the mounting frame 110.

The roller 120 can be driven to switch between a first position and a second position through the rotation of the mounting frame 110.

Referring to FIG. 2, when the roller 120 is in the first position, the roller 120 is below the mounting seat 100 and subjected to an upward force exerted by a support surface. The first rotating shaft 130 has a tendency to move towards the second end, such that the first rotating shaft 130 abuts against one end of the limiting rod 210. The other end of the limiting rod 210 abuts against the mounting frame 110, so that the mounting frame 110 achieves self-locking.

Referring to FIG. 3, when the limiting rod 210 is separated from the first rotating shaft 130, the first rotating shaft 130 can move towards the second end. The roller 120 is driven to move upward through the rotation of the mounting frame 110, so that the roller 120 is above than a lowermost end of the mounting seat 100, i.e., the roller 120 is in the second position.

It should be appreciated that the mounting seat 100 of the lifting and placing caster is mounted at a lower end of a side wall of the device. When the roller 120 is positioned in the first position, the roller 120 can support the device and drive the device to move. When the roller 120 is in the second position, the roller 120 does not support the device any more.

Referring to FIG. 2 and FIG. 3, when the roller 120 is required, the mounting frame 110 is rotated counterclockwise such that the roller 120 moves to the first position. At this time, the roller 120 is below the mounting seat 100, and the roller 120 is in contact with the ground to support the device. The roller 120 is subjected to an upward force exerted by the ground, such that the mounting frame 110 has a tendency to swing upward at one end away from the mounting seat 110, and the swing rod 200 also has a tendency to swing upward at one end away from the mounting seat 100. That is, the mounting frame 110 has a tendency to rotate clockwise around the point B, and the swing rod 200 has a tendency to rotate clockwise around the point A. In other words, the first rotating shaft 130 has a tendency to move leftward. At this time, the first rotating shaft 130 abuts against a right end of the limiting rod 210 and exerts a force to the limiting rod 210 to drive the limiting rod 210 rotate in a clockwise direction, such that the other end of the limiting rod 210 abuts against the mounting frame 110. The mounting frame 110 blocks the limiting rod 210 from continuing to rotate in the clockwise direction. Finally, the first rotating shaft 130 cannot move leftward due to being blocked by the limiting rod 210, such that the mounting frame 110 achieves self-locking and the roller 120 remains below the mounting seat 100.

Referring to FIG. 2 and FIG. 3, when the roller 120 is not required, the limiting rod 210 is separated from the first rotating shaft 130. The first rotating shaft 130 moves leftward. The mounting frame 110 rotates clockwise around the point B, and the swing rod 200 rotates clockwise around the point A, thereby driving the roller 120 to swing upward to the second position. The roller 120 is above the lowermost end of the mounting seat 100. At this time, the roller 120 does not support the device any more.

It should be noted that the limiting rod 210 is separated from the first rotating shaft 130 in the following ways. In the first way, the limiting rod 210 is separated from the mounting frame 110 when the limiting rod 210 is directly disassembled. In the second way, referring to FIG. 2, a downward force is exerted to a left end of the limiting rod 210, such that the limiting rod 210 overcomes a force of the first rotating shaft 130 to rotate in a counterclockwise direction. At this time, the limiting rod 210 pushes the first rotating shaft 130 to move rightward. When the right end of the limiting rod 210 is gradually above the first rotating shaft 130, the limiting rod 210 does not block the first rotating shaft 130 any more. The first rotating shaft 130 can move towards the second end of the strip through hole 140, that is, move leftward. At the same time, the mounting frame 110 rotates in the clockwise direction around the point B, and the swing rod 200 rotates in the clockwise direction around the point A, thereby driving the roller 120 to swing upward to the second position.

The lifting and placing caster is simple in structure, easy to operate, and convenient for users.

According to some embodiments of the present disclosure, referring to FIG. 2, the mounting frame 110 is positioned on a left side of the mounting seat 100. The mounting frame 110 is fixedly provided with a second rotating shaft 150. An axial direction of the second rotating shaft 150 is a front-back direction, and a middle of the limiting rod 210 is rotatably connected to the second rotating shaft 150.

Referring to FIG. 2, when the roller 120 is in the first position, the second rotating shaft 150 is positioned above the strip through hole 140, and the right end of the limiting rod 210 is positioned below the first rotating shaft 130. The first rotating shaft 130 exerts a leftward force to the limiting rod 210 such that the limiting rod 210 has a tendency to rotate clockwise. The mounting frame 110 abuts against the left end of the limiting rod 210 to prevent the limiting rod 210 from continuing to rotate in the clockwise direction. At this time, the mounting frame 110 achieves self-locking.

Referring to FIG. 2 and FIG. 3, when the mounting frame 110 is in the self-locking state, the limiting rod 210 is operated to rotate counterclockwise. The limiting rod 210 pushes the first rotating shaft 130 to move towards the first end of the strip through hole 140, such that the right end of the limiting rod 210 gradually moves to above the first rotating shaft 130. The first rotating shaft 130 then moves towards the second end, thereby driving the mounting frame 110 to swing upward and moving the roller 120 to the second position. It should be appreciated that the roller 120 can be subjected to the upward force exerted by the ground so as to drive the first rotating shaft 130 to move towards the second end, or the first rotating shaft 130 can be artificially controlled to move towards the second end when the first rotating shaft 130 moves towards the second end.

In an embodiment, referring to FIG. 2 and FIG. 3, a via hole 160 is formed in an upper end of the mounting frame 110, and the left end of the limiting rod 210 can rotate upward or downward through the via hole 160. When the roller 120 is positioned in the first position, the left end of the limiting rod 210 is positioned above the via hole 160. When the roller 120 has to move to the second position, a downward force is exerted to the left end of the limiting rod 210 such that the left end of the limiting rod 210 enters the mounting frame 110 through the via hole 160. At this time, the right end of the limiting rod 210 can rotate upward, thus not blocking the first rotating shaft 130.

According to some embodiments of the present disclosure, referring to FIG. 1 and FIG. 2, the lifting and placing caster further includes a reset spring 220. Referring to FIG. 2, a right end of the reset spring 220 is connected to the first rotating shaft 130, and a left end of the reset spring 220 is connected to the mounting frame 110. The reset spring 220 is always in a stretching state, such that the reset spring 220 exerts a force to the first rotating shaft 130 to move towards the second end.

It should be appreciated that, referring to FIG. 3, when the roller 120 is in the second position, the reset spring 220 exerts a force to the first rotating shaft 130 to move towards the second end, thereby preventing the first rotating shaft 130 from moving towards the first end due to gravity, and preventing the roller 120 from moving downward. Moreover, in a process of the roller 120 moving from the first position to the second position, when the limiting rod 210 rotates in a counterclockwise direction and the right end of the limiting rod 210 is positioned above the first rotating shaft 130, the first rotating shaft 130 can move towards the second end under the action of the reset spring 220 without manual operation, thus saving time and effort.

In an embodiment, referring to FIG. 2, when the roller 120 is in the first position, the connecting end between the swing rod 200 and the mounting seat 100 is above the first rotating shaft 130. That is, the point A is above the first rotating shaft 130. When the limiting rod 210 is separated from the first rotating shaft 130 due to rotating, the first rotating shaft 130 moves towards the second end under the cooperation of the reset spring 220 and the roller 120. The roller 120 is not subjected to the force exerted by the ground any more after leaving the ground. The first rotating shaft 130 continues to move towards second end under the action of the reset spring 220, thereby driving the swing rod 200 and the mounting frame 110 to rotate in a clockwise direction.

According to some embodiments of the present disclosure, referring to FIG. 2 and FIG. 3, the lifting and placing caster further includes a torsional spring 230 mounted on the limiting rod 210. The torsional spring 230 exerts a twisting force to the limiting rod 210 such that the limiting rod 210 has a tendency to rotate in a clockwise direction. It should be appreciated that when the roller 120 moves from the second position to the first position, the first rotating shaft 130 moves towards the first end, and the first rotating shaft 130 overcomes the force of the torsional spring 230 on the limiting rod 210 and gradually moves to the right end of the limiting rod 210. In this process, the limiting rod 210 rotates in the counterclockwise direction under the push of the first rotating shaft 130. When the first rotating shaft 130 moves to the right end of the limiting rod 210, the limiting rod 210 rotates in a clockwise direction under the action of the torsional spring 230, such that the right end of the limiting rod 210 is below the first rotating shaft 130, and the limiting rod 210 can prevent the first rotating shaft 130 from moving towards the second end, thereby achieving self-locking of the mounting frame 110. A manual operation can be saved due to the existence of the torsional spring 230.

Referring to FIG. 2 and FIG. 3, when the roller 120 is in the second position, a lower end of the limiting rod 210 fits with the first rotating shaft 130. When the first rotating shaft 130 moves towards the first end such that the right end of limiting rod 210 is positioned on the left side of the first rotating shaft 130, the limiting rod 210 rotates clockwise under the action of the torsional spring 230 such that the right end of the limiting rod 210 is below the first rotating shaft 130. The left end of the limiting rod 210 abuts against the mounting frame 110, and the roller 120 moves to the first position, so that the mounting frame 110 achieves self-locking.

In the description of the present disclosure, the description of the reference term "some embodiments" intends to be included in at least one embodiment or example of the present disclosure in combination with the specific features, structures, materials or characteristics of this embodiment or example. In this specification, the schematic expression of the above terms does not need for the same embodiment or example. Moreover, the described specific features, structures, materials or characteristics may be combined in one or more embodiments or examples in a suitable manner.

Although the embodiments of the present disclosure have been presented and described, those of ordinary skill in the art may understand that various changes, modifications, replacements and deformations can be made to these embodiments without deviating from the principle and gist of the present disclosure, and the scope of the present disclosure is defined by the appended claims and their equivalents.

What is claimed is:

1. A lifting and placing caster, comprising:

a mounting seat;

a mounting frame, wherein one end of the mounting frame is rotatably connected to the mounting seat, the mounting frame comprises a roller positioned on a lower side of the mounting frame, a first rotating shaft, a strip through hole throughout which the first rotating shaft is disposed so that the first rotating shaft is able to reciprocate in an extension direction of the strip through hole, two ends of the strip through hole are a first end and a second end, respectively, and the first end is positioned between the second end and a connecting end between the mounting frame and the mounting seat;

a swing rod, wherein one end of the swing rod is rotatably connected to the mounting seat, and the other end of the swing rod is rotatably connected to the first rotating shaft; and a limiting rod rotatably connected to the mounting frame;

wherein the roller is capable of being driven to switch between a first position and a second position through the rotation of the mounting frame;

in response to the roller being in the first position, the roller is below the mounting seat and subjected to an upward force exerted by a support surface, and the first rotating shaft has a tendency to move towards the second end such that the first rotating shaft abuts against one end of the limiting rod, the other end of the limiting rod abuts against the mounting frame, and the mounting frame achieves self-locking; and in response to the limiting rod being separated from the first rotating shaft, the first rotating shaft is capable of moving towards the second end, the roller is driven to move upward to the second position through the rotation of the mounting frame, and in response to the roller being in the second position, the roller is above a lowermost end of the mounting seat.

2. The lifting and placing caster according to claim 1, wherein the mounting frame is positioned on a left side of the mounting seat, a second rotating shaft is fixedly disposed on the mounting frame, and a middle of the limiting rod is rotatably connected to the second rotating shaft.

3. The lifting and placing caster according to claim 2, wherein in response to the roller being in the first position, the second rotating shaft is positioned above the strip through hole, a right end of the limiting rod is positioned below the first rotating shaft, the first rotating shaft exerts a leftward force to the limiting rod such that the limiting rod has a tendency to rotate clockwise, the mounting frame abuts against a left end of the limiting rod to limit the rotation of the limiting rod, and the mounting frame achieves self-locking.

4. The lifting and placing caster according to claim 3, wherein in response to the mounting frame being in a self-locking state and the limiting rod rotating counterclockwise, the limiting rod pushes the first rotating shaft to move towards the first end, such that a right end of the limiting rod moves to above the first rotating shaft, the first rotating shaft moves towards the second end, and the mounting frame swings upward such that the roller moves to the second position.

5. The lifting and placing caster according to claim 3, wherein a via hole is formed in an upper end of the mounting frame, and the left end of the limiting rod is capable of rotating upward or downward through the via hole.

6. The lifting and placing caster according to claim 1, wherein the lifting and placing caster further comprises a reset spring; one end of the reset spring is connected to the mounting frame and the other end of the reset spring is connected to the first rotating shaft; the reset spring is in a stretching state, so that the reset spring exerts a force to the first rotating shaft to move towards the second end.

7. The lifting and placing caster according to claim 6, wherein in response to the roller being in the first position, a connecting end between the swing rod and the mounting seat is above the first rotating shaft; and in response to the limiting rod being separated from the first rotating shaft, the first rotating shaft moves towards the second end under the cooperation of the reset spring and the roller, and the swing rod and the mounting frame rotate in a clockwise direction.

8. The lifting and placing caster according to claim 1, wherein the lifting and placing caster further comprises a torsional spring mounted on the limiting rod; and the torsional spring exerts a twisting force to the limiting rod such that the limiting rod has a tendency to rotate in a clockwise direction.

9. The lifting and placing caster according to claim 8, wherein in response to the roller being in the second position, a lower end of the limiting rod fits with the first rotating shaft; in response to the first rotating shaft moving towards the first end such that the right end of the limiting rod is positioned on a left side of the first rotating shaft, the limiting rod rotates in a clockwise direction under the action of the torsional spring such that the right end of the limiting rod is below the first rotating shaft; the left end of the limiting rod abuts against the mounting frame, the roller moves to the first position, and the mounting frame achieves self-locking.

10. The lifting and placing caster according to claim 1, wherein in response to the roller being in the first position, the strip through hole extends in a left-right direction, a right end of the strip through hole is the first end, and a left end of the strip through hole is the second end.

* * * * *